Patented Sept. 4, 1934

1,972,085

UNITED STATES PATENT OFFICE 1,972,085

ART OF TREATING METAL BEARING ORES

Dana W. Bowers and Ernest F. Bowers, Philadelphia, Pa.; said Ernest F. Bowers assignor to said Dana W. Bowers No Drawing. Application March 23, 1931, Serial No. 524,758

10 Claims. (Cl. 209—178)

Our invention relates to the recovery of precious metals from their ores by amalgamation. In making our invention we have had in mind that in the treatment, for example, of sulphur and arsenic bearing ores to recover therefrom precious metals therein, by the use of mercury, the mercury losses have been excessive so that the practical abandonment of that method of recovery has resulted. An object of our invention is to reduce to the minimum the mercury losses. Another object of our invention is to increase to the maximum the recovery of precious metals so that, for example, particles of gold so small as to be colloidal may be recovered by amalgamation and at a cost making it well worth while to recover the precious metal even in that state of fineness. It is a feature of our invention that the amalgamating medium shall be in such a state of fineness that there is complete, or substantially complete flouring of the mercury used, so that when mixed with the ground or roasted ore, it will be dispersed or disseminated so thoroughly throughout the mass of ore as to secure its presentation to the smallest particles of precious metal present in the ore, and after such thorough dispersion or dissemination, by the evolution of hydrogen (as by the action of a suitable reagent upon zinc with which the mercury in the floured state is combined) the amalgamation of these exceedingly fine particles of precious metal is quickly effected.

The process forming or constituting our invention is applicable to ores containing gold, silver, platinum and mercury, and when using the term "precious metal", we mean any one and all of these metals.

Ordinarily flouring of mercury in an amalgamation process is considered objectionable. By our invention we promote flouring, and the completer the flouring, the more efficient is the treatment.

Our invention consists in whatever is described by or is included within the terms or scope of the appended claims, for the examples of the practice of our invention, which we shall hereinafter set forth, are to be taken by way of illustration or exemplification of good procedures, in accordance with our invention, but not restrictions or limitations of the scope of our protection beyond the requirements of the claims when given their proper or fair meaning and scope.

In the practice of our invention, we start with the ore in a dry milled or pulverized state, whether raw or roasted and mix therewith an amalgam of mercury and zinc, for example, the zinc being preferably in the form of a dust and in any proportion within wide limits. The greater the proportion of the zinc, the better or more efficient the amalgamation. With this mixture, some reagent is added which upon the addition of water to the mixture will result in the evolution of hydrogen by reaction with the zinc. The reagent may be a bi-sulphate salt such as finely ground sodium bi-sulphate or nitre cake, this reagent being in a dry state at the time of admixture and being an acid salt. Another reagent that may be employed with good results is commercial sulphuric acid which is added to the pulp simultaneously, with the water for dilution of the pulp.

The amalgamating action is effected or promoted by the ionizing action of hydrogen which is generated or evolved at the surfaces of the metallic particles.

The results of the treatment, as above described, which comprises the step, first, of the dry mixing of the metal bearing ores, ground or pulverized, and the comminuted or floured amalgam of mercury and zinc, and the step of liquefying or pulping with evolution of hydrogen, are the occlusion of the precious metal particles in mercury, or the amalgamation thereof, and the agglomeration of the mercury in a very large proportion. Thus, by the retorting off of the agglomerates, the gold or other precious metal occluded by the mercury is recovered, and the mercury is salvaged to a high degree. The small percentage of mercury which fails to agglomerate is in a very fine state so that, upon dilution of the pulp, it is readily carried to the surface by the excess of hydrogen present and may thereupon be salvaged. The addition of a suitable flotation reagent at this stage, promotes or facilitates the recovery, as froth, of the mercury-precious metal float. As an example of a suitable flotation reagent, we mention sodium oleate, which, subjected to the action of sulphuric acid is broken up with the liberation of fatty acid and the formation of an alkaline sulphate with the base of the soap or sodium oleate.

In the practice of our process, mercury traps and amalgamated metal plates may be used. Although copper plates may be used with good results, we prefer brass plates because the zinc of the brass extends the evolution of hydrogen in the presence of the precious metals to the end of the plates, the mixture being subjected to the action of nascent hydrogen.

The preferred amount of amalgam introduced into the dry ore is about .25% of the weight of ore treated.

These proportions of the amalgam elements, and of amalgam to ore may, vary widely with good results. We do not confine ourselves to proportion within narrow limits. Thus, we may vary the proportion of mercury to zinc as mercury 80% to 99.9% and zinc 20% to .1%. The proportion of amalgam to ore may vary from one to one hundred ounces per ton of ore treated.

The amount of dry acid salt added to the powdered ore or the acid in liquid form added to the ore simultaneously with water dilution thereof, may vary from .01% to 20% of the ore treated. Variations in the amounts of amalgamating agents used per ton of ore are governed by the amount of recoverable free metals, also the acidity or basicity of the ore prior to treatment.

What we claim is:—

1. A method of treating metal bearing ores which includes the acts of disseminating through the ore in a ground state of an amalgam including mercury and a substance which in the presence of water results in evolution of hydrogen and in the absence of moisture that would cause premature conglomeration of the amalgam and then causing the evolution of hydrogen in close proximity to the metal particles to be amalgamated by the addition of water.

2. A method of treating metal bearing ores which includes the acts of disseminating through the ore in a ground dry state an amalgam including mercury in a substantially completely floured state and a substance by which hydrogen may be evolved and then maintaining such floured state, and adding water to the mixture to cause the evolution of hydrogen in close proximity to the metal particles to be amalgamated.

3. A method of treating precious metal bearing ores which includes the acts of disseminating through the dry ore in a ground state an amalgam of mercury and zinc and a bisulphate salt from which hydrogen may be evolved, and then causing the evolution of hydrogen in proximity to the metal particles to be amalgamated by subjecting the mixture to water treatment.

4. A method of treating precious metal bearing ores which includes the acts of disseminating through the dry ore in a ground state an amalgam of mercury and zinc and sulphuric acid, and then causing the evolution of hydrogen in proximity to the metal particles to be amalgamated by subjecting the mixture to water treatment.

5. A method of treating metal-bearing ores which includes the acts of disseminating through the ore in a dry state an amalgam including mercury under conditions which prevent premature agglomeration of the amalgam and then supplying water to the mixture in the presence of a reagent that causes evolution of hydrogen.

6. A method as in claim 5 in which the reagent is a dry acid salt added to the mixture before supplying water thereto.

7. A method of treating precious metal-bearing ores which comprises the admixture in a dry state of ore with mercury zinc amalgam under conditions which flour the amalgam to a high degree and thereafter with the amalgam in such floured condition wetting the mixture with acidified water and agglomerating the amalgam and the entrained precious metal.

8. A method of treating precious metal bearing ores which includes the admixture of the ore in the absence of free acid, with mercury-zinc amalgam under conditions which flour the amalgam to a high degree and thereafter with the amalgam still in a floured state wetting the mixture with acidified water and agglomerating the amalgam and entrained precious metal.

9. A method of treating precious metal bearing ores which includes the acts of the admixture of the ore with mercury-zinc amalgam, and soluble salts which upon the addition of water will result in evolution of hydrogen in close proximity to the metal particles to be amalgamated and under conditions which flour the amalgam and thereafter promoting agglomeration of the floured amalgam and entrained precious metal by wetting the mixture with water.

10. A method of treating metal bearing ores which includes the acts of dissemination through the ore in a ground state of an amalgam including mercury, the amalgam being in a floured state and under conditions which maintain that floured state until dissemination is effected and contact is effected between the floured amalgam and particles of metal present in the ore and after such dissemination, subjecting the admixture to the action of nascent hydrogen in proximity to the metal particles to be amalgamated and thereby promoting amalgamation.

DANA W. BOWERS.
ERNEST F. BOWERS.